(12) United States Patent
Zhytar et al.

(10) Patent No.: US 8,923,158 B2
(45) Date of Patent: Dec. 30, 2014

(54) SMART TRAFFIC OPTIMIZATION

(75) Inventors: Georgiy Zhytar, Donetsk (UA); Eduard Tichy, Brumov-Bylnice (CZ)

(73) Assignee: Solarwinds Worldwide, LLC, Austin, TX (US)

( * ) Notice: Subject to any disclaimer, the term of this patent is extended or adjusted under 35 U.S.C. 154(b) by 616 days.

(21) Appl. No.: 12/788,918

(22) Filed: May 27, 2010

(65) Prior Publication Data

US 2011/0292818 A1 Dec. 1, 2011

(51) Int. Cl.
*G01R 31/08* (2006.01)
*H04L 12/54* (2013.01)
*H04L 12/26* (2006.01)

(52) U.S. Cl.
CPC .............. *H04L 43/04* (2013.01); *H04L 42/026* (2013.01)
USPC ............ 370/253; 370/429; 707/665; 707/668

(58) Field of Classification Search
None
See application file for complete search history.

(56) References Cited

U.S. PATENT DOCUMENTS

| | | | |
|---|---|---|---|
| 8,010,644 B1 * | 8/2011 | Zang et al. | 709/223 |
| 2005/0234920 A1 * | 10/2005 | Rhodes | 707/10 |
| 2007/0055789 A1 * | 3/2007 | Claise et al. | 709/234 |
| 2007/0115850 A1 * | 5/2007 | Tsuchiya et al. | 370/252 |
| 2008/0279111 A1 * | 11/2008 | Atkins et al. | 370/252 |
| 2010/0150004 A1 * | 6/2010 | Duffield et al. | 370/252 |
| 2010/0157809 A1 * | 6/2010 | Duffield et al. | 370/241 |

* cited by examiner

*Primary Examiner* — Christine Duong

(74) *Attorney, Agent, or Firm* — Squire Patton Boggs (US) LLP

(57) ABSTRACT

Embodiments of the invention include an apparatus, method, and computer program for collecting and analyzing network traffic flow records. The method includes, in one example, receiving a plurality of flow records which include data about traffic in a network. The method may further include caching the plurality of flow records in temporary storage, analyzing the plurality of flow records to determine a number of bytes of traffic that each of the plurality of flow records represents, and selecting a subset of the plurality of flow records to forward to permanent storage based on the determined number of bytes of each of the flow records.

17 Claims, 5 Drawing Sheets

SMART TRAFFIC OPTIMIZATION

BACKGROUND

1. Field

Embodiments of the invention generally relate to network traffic analysis. More particularly, examples of the invention are directed to methods, systems, and/or computer programs for capturing and analyzing network flow data.

2. Description of the Related Art

Network traffic usage data is of interest to network administrators for a number of reasons, including analyzing the impact of a new application on the network, troubleshooting network pain points, detecting heavy users of bandwidth, and securing networks. Network usage data does not include the actual information exchanged in a communications session between parties, but rather includes numerous usage detail records, known as "flow records" containing one or more types of metadata. The primary protocol associated with traffic flow data is NetFlow which was developed by Cisco Systems®. There are also several other varieties of flow protocols, such as sFlow, IPFIX, Jflow, NetStream, and Cflowd. All of these protocols support flows that are similar to NetFlow and contain similar types of information, such as source internet protocol (IP) address, destination IP address, source port, destination port, IP protocol, ingress interface, IP Type of Service, start and finish times, number of bytes, and next hop.

In general, a flow record provides detailed usage information about a particular event or communications connection between parties, such as the connection start time and stop time, source (or originator) of the data being transported, the destination or receiver of the data, and the amount of data transferred. A flow record can summarize usage information for very short periods of time (from milliseconds to seconds, occasionally minutes). Depending on the type of service and network involved, a flow record may also include information about the transfer protocol, the type of data transferred, the type of service (ToS) provided, etc.

As networks become larger and more complex, systems that analyze and report on traffic flow data must become more efficient at handling the increasing amount of information generated about network traffic. Aggregating data from many network devices can result in datasets that contain billions of entries or flows. Such a large number of entries can create a bottleneck in the system because writing to storage can be time consuming. Additionally, running reporting queries on a dataset of large size can be taxing on the storage system or database. Traditional methods for solving this data overflow problem have been to improve the quantity or quality of the hardware that hosts the storage system or to randomly drop whatever information cannot be handled.

SUMMARY

One embodiment of the invention is directed to a method. The method includes receiving a plurality of flow records, the flow records comprising data about traffic in a network. The method further includes caching the plurality of flow records in temporary storage, analyzing the plurality of flow records to determine a number of bytes of traffic that each of the plurality of flow records represents, and selecting a subset of the plurality of flow records to forward to permanent storage based on the determined number of bytes of each of the flow records. In one embodiment, the caching of the flow records is performed during a predetermined time period and/or for a predetermined number of flow records.

Another embodiment is directed to an apparatus. The apparatus includes a receiver configured to receive a plurality of flow records, the flow records comprising data about traffic in a network. The apparatus may also include temporary storage configured to temporarily cache the plurality of flow records. The apparatus further includes a processor configured to control the apparatus to analyze the plurality of flow records to determine a number of bytes of traffic that each of the plurality of flow records represents, and to select a subset of the plurality of flow records to forward to permanent storage based on the determined number of bytes of each of the flow records.

Another embodiment is directed to a computer program embodied on a computer readable medium. The computer program is configured to control a processor to perform operations including receiving a plurality of flow records, the flow records comprising data about traffic in a network. The operations further include caching the plurality of flow records in temporary storage, analyzing the plurality of flow records to determine a number of bytes of traffic that each of the plurality of flow records represents, and selecting a subset of the plurality of flow records to forward to permanent storage based on the determined number of bytes of each of the flow records.

Another embodiment is directed to an apparatus. The apparatus includes receiving means for receiving a plurality of flow records, the flow records comprising data about traffic in a network. The apparatus further includes caching means for caching the plurality of flow records in temporary storage, analyzing means for analyzing the plurality of flow records to determine a number of bytes of traffic that each of the plurality of flow records represents, and selecting means for selecting a subset of the plurality of flow records to forward to permanent storage based on the determined number of bytes of each of the flow records.

BRIEF DESCRIPTION OF THE DRAWINGS

For proper understanding of the invention, reference should be made to the accompanying drawings, wherein.

DETAILED DESCRIPTION

Embodiments of the present invention include a method, apparatus, system, and/or computer program for collecting, storing, and analyzing traffic flow data. Given that every computer system is limited by resources such as computing power, storage, and bandwidth, it is important for systems that use those resources to be efficient. That is especially true when the system works with traffic flow data because network traffic is often subject to spikes and even steady traffic can result in a large continuous stream of flows. Embodiments of the present invention deal with these flows by flushing only a certain set of these flows from temporary storage to permanent storage. The system will then only need to run analyses on this smaller data set. As a result, certain implementations of the invention can reduce the total amount of storage required, the total amount of bandwidth used between temporary and permanent storage, and the total amount of processing power and memory used to run reports on the flow data. Traditional systems have reduced storage and bandwidth requirements by dropping flows, which does not guarantee retention of a preset percent of traffic data.

Therefore, embodiments of the invention include a system, apparatus, and method for storing flows based on the number of bytes of traffic that each flow represents. In large environments, testing shows that the flows that carry information of about 95% of total bytes traversing through the environment compose just 5% of total number of flows. In other words, a small subset of flows contain the majority of bytes. So, embodiments of the invention store the flows that represent larger data transfers. By only storing the flows that represent a large number of bytes, twenty times fewer records will need to be stored by the storage mechanism and the user will still have information of about 95% of total bytes of traffic, thereby improving system throughput and performance. Such a solution is especially useful when the network administrator's primary use-case is analyzing the entities on their network that use the most traffic.

Figure 1:
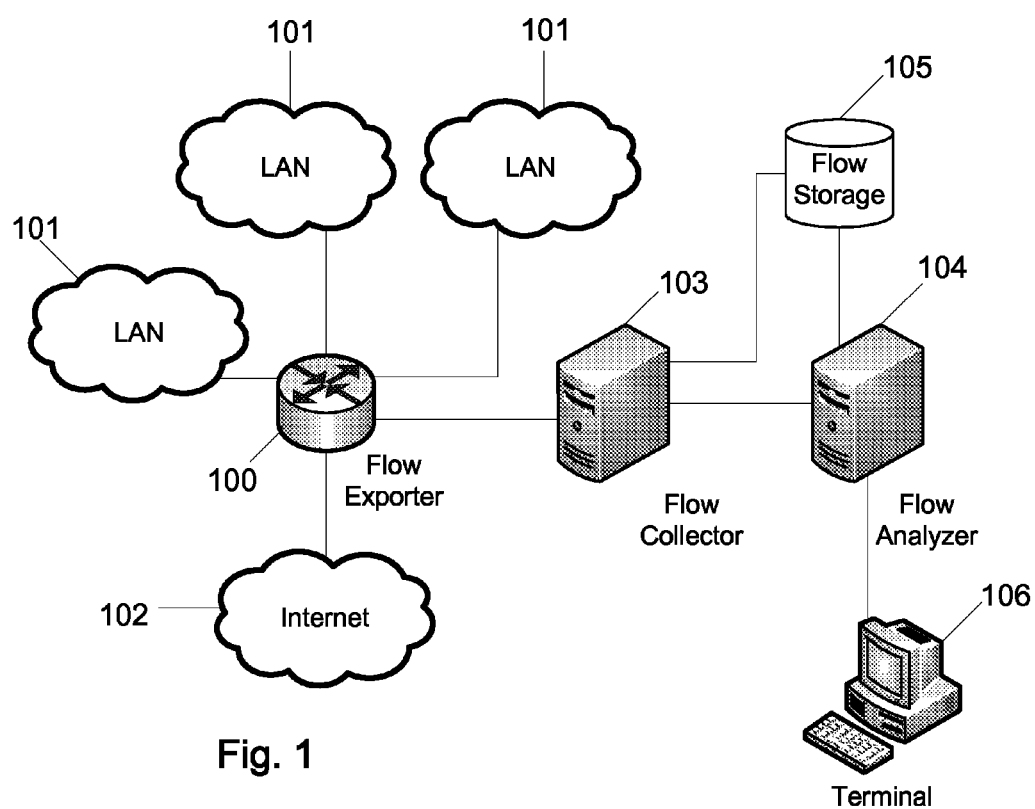
FIG. 1 illustrates a system according to one embodiment.

FIG. 1 shows an exemplary system according to one embodiment. The system includes a flow exporter 100 connected to LANs 101 and/or the Internet 102. The devices on the LANs 101 may use the flow exporter 100 to communicate with one another. The flow exporter 100 may be a router or any other network device that sends out traffic flow data. Although there is only one flow exporter 100 shown in FIG. 1, there may be any number of flow exporters on the network. In one embodiment, the flow exporter 100 collects data about traffic on a network and eventually composes that data into flows.

The flow exporter 100 then communicates flows, either directly or indirectly, to the flow collector 103. The flow exporter 100 may be configured to send the flows at a range of times or frequencies. While a single flow collector 103 is illustrated in FIG. 1, there may be multiple flow collectors on a network. Once flows are received, the flow collector 103 caches the flows in temporary storage.

While in the cache, two or more flows may be combined into a single flow if they are sufficiently similar, such as if they have the same or similar source IP address, destination IP address, source port, destination port, IP protocol, ingress interface, and IP Type of Service, or are representative of a single service so that the single flow represents more bytes of traffic. A portion of these cached flows are then flushed to the permanent flow storage 105 when either the cache is full or a collection timer is up. In some embodiments, the cache size is 50,000 flows and a the timer is set to one minute. These settings, however, are variable so as to adapt to the size of the network and the goals of the network administrator.

Before the flows are flushed, the flow collector 103 selects the flows that represent the largest number of bytes. In one example, enough flows are selected in order to get a set percentage of all bytes traveling though the network. For instance, for many networks, the optimal setting is to record 95% of all bytes of traffic. This is because the top 5% of flows often represent the top 95% of traffic. With this setting, the user can experience a great increase in network monitoring performance because only $1/20^{th}$ of the flows have to be written to the permanent flow storage 105 which is often the bottleneck of such systems as it takes longer to write to permanent storage. When the flow collector 103 flushes these flows, the flow collector 103 also writes the number and percent of flows saved to a log. This kind of logging could be used to evaluate the effectiveness of different settings in the system.

Once flows are written to the permanent flow storage 105, the flow analyzer 104 can then query the permanent flow storage 105 to retrieve information regarding the top 95% of traffic. Such a configuration results in a faster system because there is significantly less traffic stored to the permanent flow storage 105. The system illustrated in FIG. 1 may also include a terminal 106 that allows a user to communicate with flow analyzer 104 and to receive information regarding the performance of the network, for example.

Figure 2:
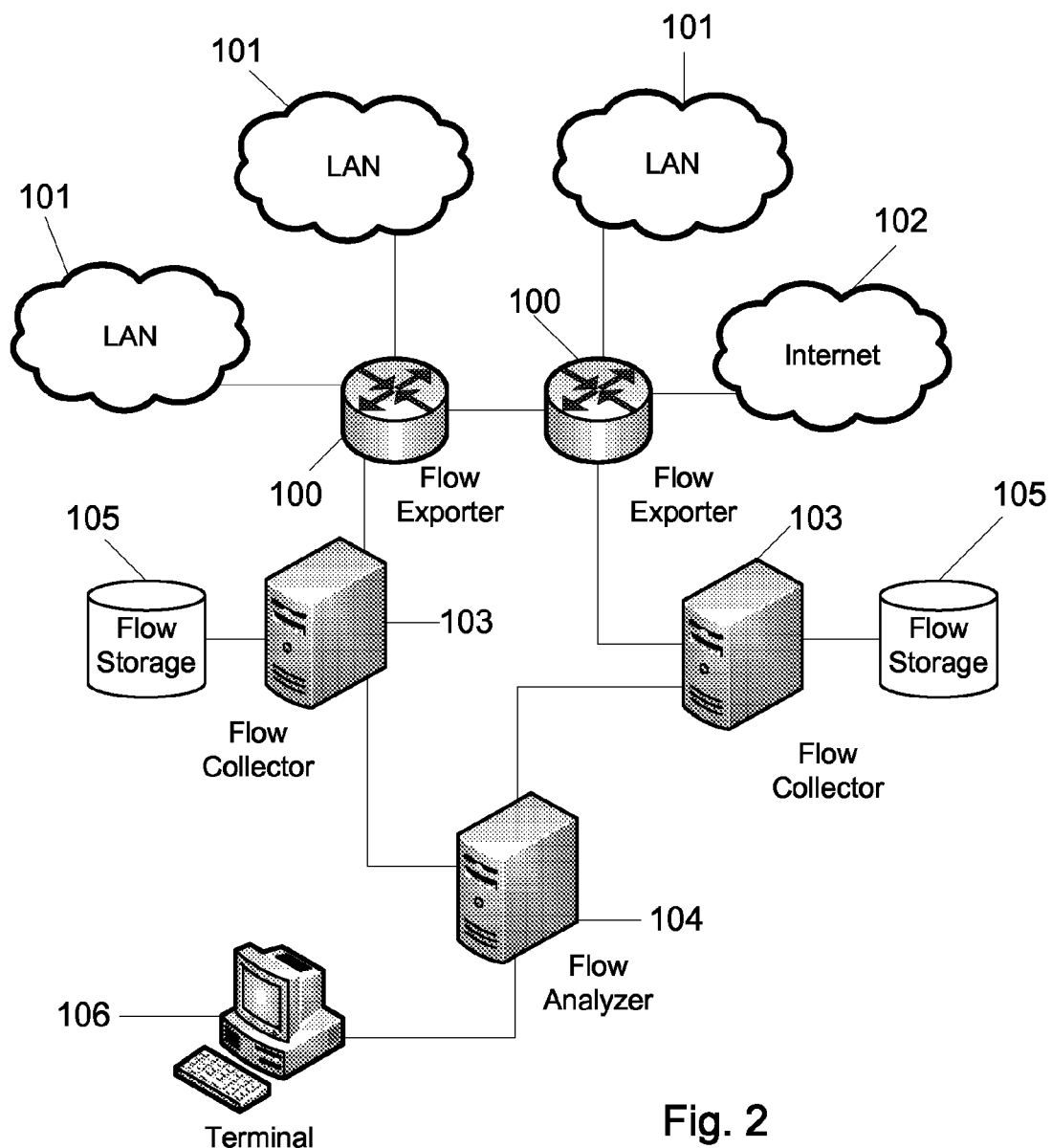
FIG. 2 illustrates a system according to another embodiment.

FIG. 2 illustrates another exemplary system according to one embodiment. This embodiment of the invention is similar to that shown in FIG. 1 but includes multiple flow exporters 100, flow collectors 103, and flow storage 105. In addition, FIG. 2 shows that each flow collector 103 may have permanent flow storage 105 attached to it, in accordance with one embodiment. The flow analyzer 104 can poll the flow collectors 103 or their flow storage 105 to produce reports. In some circumstances, this may yield better performance on the collection and storing of flows. It may also improve the speed of queries because the system is better distributed. In one embodiment, the flow collector 103 would drop the flows that record small data transfers before writing to its personal permanent flow storage 105.

Figure 3:
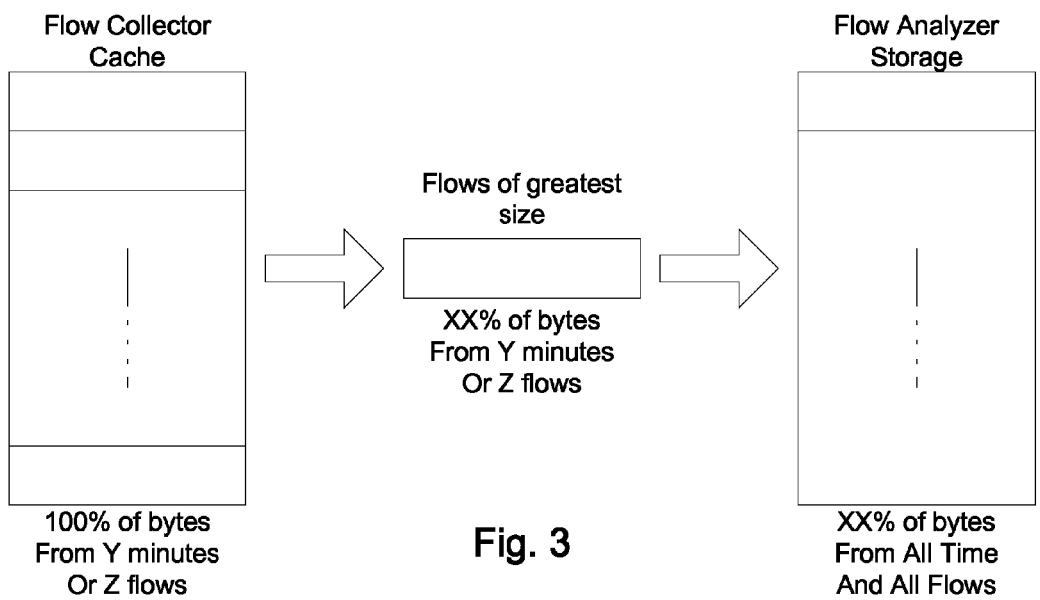
FIG. 3 illustrates a block diagram according to an embodiment of the invention.

FIG. 3 illustrates a block diagram showing how the cache is compressed to a small number of flows before being flushed, in accordance with an embodiment. This compression occurs in the faster temporary storage of the flow collector 103. There are a number of ways that this could be accomplished. In one implementation, the array of flows could be sorted in memory, either as they are received or after the cache is ready, and flushed until the minimum percentage of bytes have been pushed to permanent storage. The smaller flows could also be dropped instead of sorted to save processing by simply recording the total number of bytes they represent.

Figure 4:
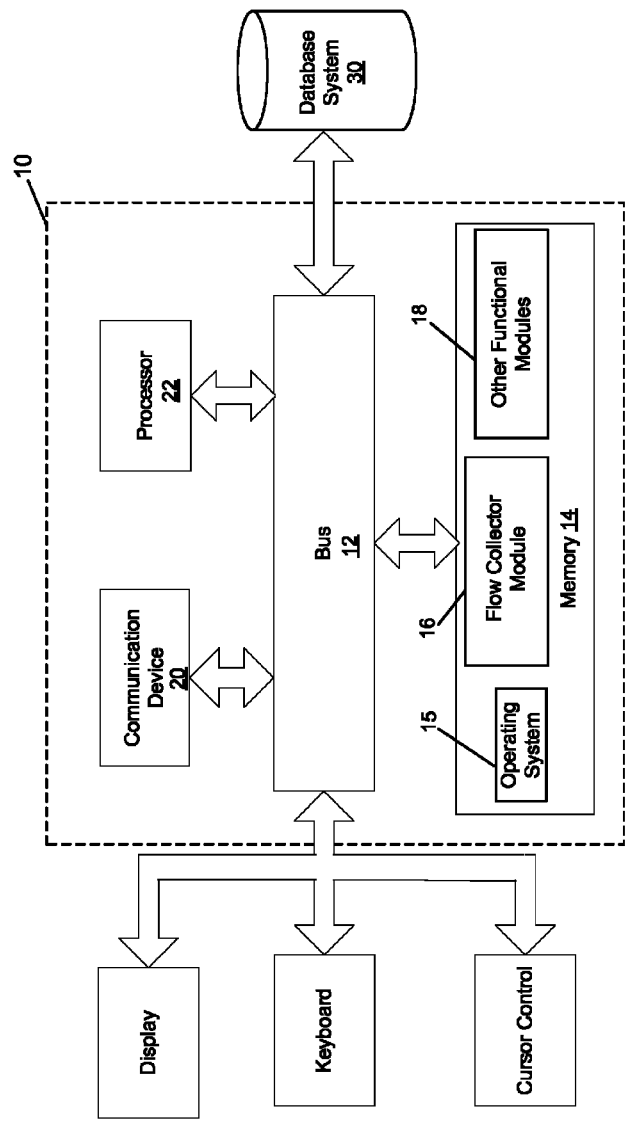
FIG. 4 illustrates a block diagram of an exemplary apparatus according to one embodiment.

FIG. 4 illustrates a block diagram of a system 10 that may implement one embodiment of the invention. In some embodiments, system 10 is flow collector 103 discussed above in reference to FIGS. 1 and 2. System 10 includes a bus 12 or other communications mechanism for communicating information between components of system 10. System 10 also includes a processor 22, coupled to bus 12, for processing information and executing instructions or operations. Processor 22 may be any type of general or specific purpose processor. System 10 further includes a memory 14 for storing information and instructions to be executed by processor 22. In an exemplary embodiment, memory 14 is temporary memory, such as cache. In other embodiments, memory 14 can be comprised of any combination of random access memory ("RAM"), read only memory ("ROM"), static storage such as a magnetic or optical disk, or any other type of machine or computer readable media. System 10 may further include a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD") of terminal 106, for displaying information to a user, such as network traffic information. A keyboard 26 and a cursor control device 28, such as a computer mouse, are further coupled to bus 12 to enable a user to interface with system 10. Processor 22 and memory 14 may also be coupled via bus 12 to a database system 30 and, thus, may be able to access and retrieve information stored in database system 30. In one embodiment, database system 30 is the permanent flow storage 105 illustrated in FIGS. 1 and 2. Although only a single database is illustrated in FIG. 4, any number of databases may be used in accordance with certain embodiments.

In one embodiment, memory 14 stores software modules that provide functionality when executed by processor 22. The modules may include an operating system 15 that provides operating system functionality for system 10. The memory may also store a flow collector module 16, which provides an enhanced network traffic flow solution through improved performance and throughput of network traffic flow collection and analysis. System 10 may also include one or more other functional modules 18 to provide additional functionality.

Database system 30 may include a database server and any type of database, such as a relational or flat file database. Database system 30 may store data related to network traffic flow of each of the entities in the network, and/or any data associated with system 10 or its associated modules and components.

In certain embodiments, processor 22, flow collector module 16, and other functional modules 18 may be implemented as separate physical and logical units or may be implemented in a single physical and logical unit. Furthermore, in some embodiments, processor 22, flow collector module 16, and other functional modules 18 may be implemented in hardware, or as any suitable combination of hardware and software.

Additionally, in some embodiments, system 10 may include a receiver configured to receive a plurality of flow records. The receiver may be further configured to receive the flow records at a predetermined range of times and/or frequencies. The flow records may generally include data about traffic in a network. Once such a flow record is received, processor 22 is configured to control system 10 to temporarily cache the plurality of flow records in temporary storage. Once the flow records are temporarily cached, processor 22 can control system 10 to analyze the plurality of flow records to determine a number of bytes of traffic that each of the plurality of flow records represents. According to one embodiment, processor 22 is further configured to control system 10 to select a subset of the plurality of flow records to forward to permanent storage based on the determined number of bytes of each of the flow records.

More specifically, according to an embodiment, once the number of bytes of traffic for each of the flow records is determined, processor 22 may be further configured to control system 10 to rank flow records from largest to smallest based on the number of bytes of traffic that each of the flow records represents. In some embodiments, the processor 22 is further configured to control system 10 to select the subset of flow records that represent a top five percent of the plurality of flow records in terms of the number of bytes.

Figure 5:
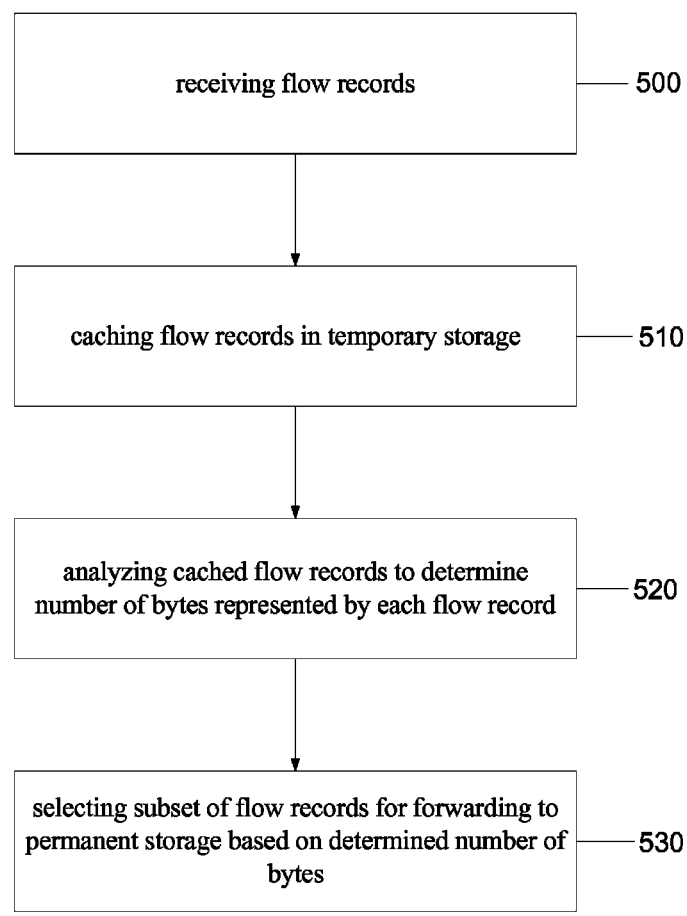
FIG. 5 illustrates a method in accordance with one embodiment.

Embodiments of the invention also include a method for collecting and analyzing flow records in a network, as illustrated in FIG. 5. The method includes receiving 500 a plurality of flow records which include data about traffic in a network, and caching 510 the plurality of flow records in temporary storage. In some embodiments, the flow records may be received over a set period of time or for a set number of flows. The method further includes, at 520, analyzing the plurality of flow records to determine a number of bytes of traffic that each of the plurality of flow records represents. The analyzing may include ranking flow records from largest to smallest based on the number of bytes of traffic that each of the flow records represents. The method also includes, at 530, selecting a subset of the plurality of flow records to forward to permanent storage based on the determined number of bytes of each of the flow records.

According to further embodiments, the method may include combining multiple flow records stored in the temporary storage into a single flow record if those multiple flow records are sufficiently similar. Multiple flow records may be considered sufficiently similar, for example, when the multiple flow records have a same or similar source IP address, destination IP address, source port, destination port, IP protocol, ingress interface, and/or IP type of service.

In view of the above, embodiments of the invention provide a method, system, apparatus, and/or computer program for improving throughput and performance of network traffic flow collection and analysis. Referring again to FIGS. 1 and 2, flow collector(s) 103 collects all of the traffic for a set period of time or a set number of flows. The flow collector 103 then flushes only a certain percentage of the flows to the permanent flow storage 105. The number of flows flushed to the permanent flow storage 105 may be variable based on the percentage of traffic, measured in bytes, which the system is set to capture. Accordingly, embodiments of the invention can reduce the total amount of storage required, the total amount of bandwidth used between temporary and permanent storage, and the total amount of processing power and memory used to run reports on the flow data.

The computer readable medium mentioned above may be at least partially embodied by a transmission line, a compact disk, digital-video disk, a magnetic tape, a Bernoulli drive, a magnetic disk, holographic disk or tape, flash memory, magnetoresistive memory, integrated circuits, or any other digital processing apparatus memory device.

The described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. A method, comprising:
 receiving a plurality of flow records, the flow records comprising data about traffic in a network;
 caching the plurality of flow records in temporary storage;
 analyzing the plurality of flow records to determine a number of bytes of traffic that each of the plurality of flow records represents; and selecting a subset of the plurality of flow records to forward to permanent storage based on the determined number of bytes of each of the flow records, wherein said selecting comprises selecting the subset of flow records that represent a top five percent of the plurality of flow records in terms of the number of bytes, wherein the caching comprises caching the plurality of flow records during a predetermined amount of time and for a predetermined number of flow records.

2. The method of claim 1, further comprising combining at least two of the plurality of flow records stored in the temporary storage when the at least two flow records are similar.

3. The method of claim 2, wherein the at least two flow records are similar when the at least two flow records have at least one of a same or similar source IP address, destination IP address, source port, destination port, IP protocol, ingress interface, or IP type of service.

4. The method of claim 1, wherein the receiving comprises receiving the flow records at a predetermined range of times or frequencies.

5. The method of claim 1, wherein the caching comprises ranking flow records from largest to smallest based on the number of bytes of traffic that each of the flow records represents.

6. An apparatus, comprising:
a receiver configured to receive a plurality of flow records, the flow records comprising data about traffic in a network;
temporary storage configured to temporarily cache the plurality of flow records;
a processor configured to control the apparatus to
analyze the plurality of flow records to determine a number of bytes of traffic that each of the plurality of flow records represents; and
select a subset of the plurality of flow records to forward to permanent storage based on the determined number of bytes of each of the flow records,
wherein the processor is further configured to control the apparatus to select the subset of flow records that represent a top five percent of the plurality of flow records in terms of the number of bytes,
wherein said temporary storage is configured to temporarily cache the plurality of flow records during a predetermined amount of time and for a predetermined number of flow records.

7. The apparatus of claim 6, wherein said temporary storage is configured to combine at least two of the plurality of flow records stored in the temporary storage when the at least two flow records are similar.

8. The apparatus of claim 7, wherein the at least two flow records are similar when the at least two flow records have at least one of a same or similar source IP address, destination IP address, source port, destination port, IP protocol, ingress interface, or IP type of service.

9. The apparatus of claim 6, wherein the receiver is further configured to receive the flow records at a predetermined range of times or frequencies.

10. The apparatus of claim 6, wherein the processor is further configured to control the apparatus to rank flow records from largest to smallest based on the number of bytes of traffic that each of the flow records represents.

11. A computer program embodied on a non-transitory computer readable medium, the computer program configured to control a processor to perform operations, comprising:
receiving a plurality of flow records, the flow records comprising data about traffic in a network;
caching the plurality of flow records in temporary storage;
analyzing the plurality of flow records to determine a number of bytes of traffic that each of the plurality of flow records represents; and
selecting a subset of the plurality of flow records to forward to permanent storage based on the determined number of bytes of each of the flow records,
wherein said selecting comprises selecting the subset of flow records that represent a top five percent of the plurality of flow records in terms of the number of bytes,
wherein the caching comprises caching the plurality of flow records during a predetermined amount of time and for a predetermined number of flow records.

12. The computer program of claim 11, further comprising combining at least two of the plurality of flow records stored in the temporary storage when the at least two flow records are similar.

13. The computer program of claim 12, wherein the at least two flow records are similar when the at least two flow records have at least one of a same or similar source IP address, destination IP address, source port, destination port, IP protocol, ingress interface, or IP type of service.

14. The computer program of claim 11, wherein the receiving comprises receiving the flow records at a predetermined range of times or frequencies.

15. The computer program of claim 11, wherein the caching comprises ranking flow records from largest to smallest based on the number of bytes of traffic that each of the flow records represents.

16. The computer program of claim 11, wherein the caching comprises caching the plurality of flow records during a predetermined amount of time and/or for a predetermined number of flow records.

17. An apparatus, comprising:
receiving means for receiving a plurality of flow records, the flow records comprising data about traffic in a network;
caching means for caching the plurality of flow records in temporary storage;
analyzing means for analyzing the plurality of flow records to determine a number of bytes of traffic that each of the plurality of flow records represents; and
selecting means for selecting a subset of the plurality of flow records to forward to permanent storage based on the determined number of bytes of each of the flow records,
wherein said selecting means comprises means for selecting the subset of flow records that represent a top five percent of the plurality of flow records in terms of the number of bytes,
wherein the caching means comprises means for caching the plurality of flow records during a predetermined amount of time and for a predetermined number of flow records.

* * * * *